United States Patent
Duinat et al.

(10) Patent No.: US 10,343,482 B2
(45) Date of Patent: Jul. 9, 2019

(54) AIR-CONDITIONING AIR DISTRIBUTION DEVICE FOR A VEHICLE TURRET AND VEHICLE COMPRISING SUCH A DEVICE

(71) Applicant: NEXTER SYSTEMS, Roanne (FR)

(72) Inventors: Jean Luc Duinat, Bourges (FR); Patrick Venaille, Bourges (FR); Xavier Descatoire, Bourges (FR); Marc Clamagirand, Bourges (FR)

(73) Assignee: NEXTER SYSTEMS, Roanne (FR)

( * ) Notice: Subject to any disclaimer, the term of this patent is extended or adjusted under 35 U.S.C. 154(b) by 115 days.

(21) Appl. No.: 15/101,627

(22) PCT Filed: Nov. 26, 2014

(86) PCT No.: PCT/FR2014/053040
§ 371 (c)(1),
(2) Date: Jun. 3, 2016

(87) PCT Pub. No.: WO2015/082802
PCT Pub. Date: Jun. 11, 2015

(65) Prior Publication Data
US 2017/0028809 A1    Feb. 2, 2017

(30) Foreign Application Priority Data
Dec. 5, 2013 (FR) ...................... 13 02867

(51) Int. Cl.
*B60H 1/00* (2006.01)
*F41H 7/03* (2006.01)
(Continued)

(52) U.S. Cl.
CPC ..... *B60H 1/00028* (2013.01); *B60H 1/00414* (2013.01); *B60H 1/00564* (2013.01);
(Continued)

(58) Field of Classification Search
CPC ............ B60H 1/00028; B60H 1/00414; B60H 1/00564; B60H 1/0378; F41A 27/00; F41A 27/16; F41H 7/03; B01D 35/147
(Continued)

(56) References Cited

U.S. PATENT DOCUMENTS 2,434,752 A * 1/1948 Waller ...................... F41H 7/03
                                                      241/121
4,345,923 A * 8/1982 Schoen .............. B01D 46/0004
                                                      55/309
(Continued)

FOREIGN PATENT DOCUMENTS

EP      2145789 A1    1/2010
FR      828457 A      5/1938
WO      03/062732 A1  7/2003

OTHER PUBLICATIONS

Apr. 21, 2015 International Search Report issued in International Patent Application No. PCT/FR2014/053040.
(Continued)

*Primary Examiner* — Vivek K Shirsat
*Assistant Examiner* — Ryan L Faulkner
(74) *Attorney, Agent, or Firm* — Oliff PLC (57) ABSTRACT

A vehicle and its air-conditioning air distribution device for a vehicle turret rotatably mounted with respect to a body of the vehicle. This device includes at least one annular chute coaxial to the axis of rotation of the turret and including at least one first flow orifice, the chute having an annular opening which is concentric thereto, the chute receiving a closing ring which matches with the opening of the chute, the closing ring being rotatable with respect to the chute, and including at least one second air flow orifice, the chute being intended to be made integral with the body, respectively with
(Continued)

the turret, while the closing ring is intended to be made integral with the turret, respectively with the body.

6 Claims, 8 Drawing Sheets

(51) Int. Cl.
*F41A 27/00* (2006.01)
*F41A 27/16* (2006.01)
(52) U.S. Cl.
CPC .............. *F41A 27/00* (2013.01); *F41A 27/16* (2013.01); *F41H 7/03* (2013.01)
(58) Field of Classification Search
USPC ............ 454/136, 137, 139, 142; 296/190.03, 296/190.05, 190.09; 89/30; 137/625; 55/314
See application file for complete search history.

(56) References Cited

U.S. PATENT DOCUMENTS

| | | | | |
|---|---|---|---|---|
| 4,399,838 A | * | 8/1983 | Poujol | ................ B60H 1/00485 123/41.09 |
| 2005/0115396 A1 | | 6/2005 | Patry et al. | |
| 2007/0205633 A1 | * | 9/2007 | Waco | ................ B60H 1/00378 296/190.09 |

OTHER PUBLICATIONS

Apr. 21, 2015 Written Opinion issued in International Patent Application No. PCT/FR2014/053040.

* cited by examiner

Figure 11

AIR-CONDITIONING AIR DISTRIBUTION DEVICE FOR A VEHICLE TURRET AND VEHICLE COMPRISING SUCH A DEVICE

The technical field of the invention is that of conditioned air distribution devices for military vehicles comprising a turret.

The military vehicles with a turret require to be conditioned and ventilated so as to ensure satisfying living conditions for the crew as well as operating temperatures suitable for the onboard equipments. The circulation of air within the body is conventionally ensured by a ventilating unit coupled to an air conditioning and a ventilating network comprising ducts supplying air to the crew and the equipments. The ventilation of the turret is, however, very sensitive due to the confinement of the turret and the pivoting feature thereof which makes the connection of the body ventilating network to a turret ventilating network difficult.

Patent EP2145786 discloses a vehicle in which the ventilating unit is secured to the turret or the body, and the vehicle has two air supplying circuits. A first one for distributing air within the body, and a second one for distributing air within the turret, the two circuits being able to communicate with each other only in a particular angular position of the turret, position for which an opening of the turret ventilating network is facing an opening of the body ventilating network. In the other positions, the air no longer flows directly between the two circuits and the turret ventilating circuit collects air directly within the body by the openings of the basket of the turret.

Such a device does not allow to have a ventilation having the same performances for all angular positions of the turret with respect to the body, and particularly if the turret carries out several rotations.

The invention aims at solving this problem of non-permanence of the ventilating flows between the body and the turret.

Thus, the invention relates to a conditioned air distribution device for a vehicle turret rotatably mounted with respect to a body of the vehicle, characterized in that it comprises at least one annular chute coaxial with the axis of rotation of the turret and comprising at least one first flow orifice, the chute having an annular opening which is concentric thereto, the chute receiving a closing ring which closes the opening of the chute, the ring being rotatable with respect to the chute, and comprising at least one second air flow orifice, the chute being intended to be made integral with the body, respectively with the turret, while the seal ring is intended to be made integral with the turret, respectively with the body.

Advantageously, the device comprises means ensuring the air-tightness of the connection between the chute and the seal ring.

Advantageously, the device comprises two separate annular chutes, each one being closed by a closing ring, each chute having a first flow orifice and each closing ring having a second flow orifice.

The invention also relates to a vehicle comprising a turret having a turret ventilating network and a body having a body ventilating network, the networks each comprising ducts for supplying hot air and separate ducts for supplying cold air, the turret being pivotably mounted on an axis with respect to the body, the vehicle being characterized in that it comprises an air-conditioning air distribution device comprising at least one annular chute coaxial with the axis of rotation of the turret and having at least one first flow orifice, the chute having an annular opening which is concentric thereto, the chute receiving a closing ring which closes the opening of the chute, the closing ring being rotatable with respect to the chute and comprising at least one second air flow orifice, the chute being made integral with the body, respectively with the turret, while the closing ring is made integral with the turret, respectively with the body.

Advantageously, the one or more chutes are integral with the body and connected to the body ventilating network at the one or more first orifices, the one or more closing rings being integral with the turret and connected to the turret ventilating network by their second orifices.

Advantageously, the vehicle comprises two separate annular chutes, each one being closed by a closing ring, each chute having a first flow orifice and each closing ring having a second flow orifice, a first chute constituting a circuit for supplying cold air from the body to the turret, and a second chute constituting a circuit for returning hot air from the turret to the body.

According to another embodiment, the one or more second orifices are extended toward the turret by an aeraulic duct which is divided into two coaxial parts, the turret having a movable plate which transversely crosses the ducts between the two parts of the ducts, the plate being movable between a so-called open position and a so-called closed position, the plate comprising at least one wedge shape which is intended to cooperate, when in closed position, with the two parts of each duct so as to ensure the sealing of the duct, each wedge shape having at least one bore for the circulation of air, the bore being arranged facing the section of the duct that is crossed.

The plate could be integral with a door and pivot coaxially to the turret between a closed position and an open position of said door.

The invention will become more apparent upon reading the following description, made with reference to the appended drawings, in which.

Figure 1:
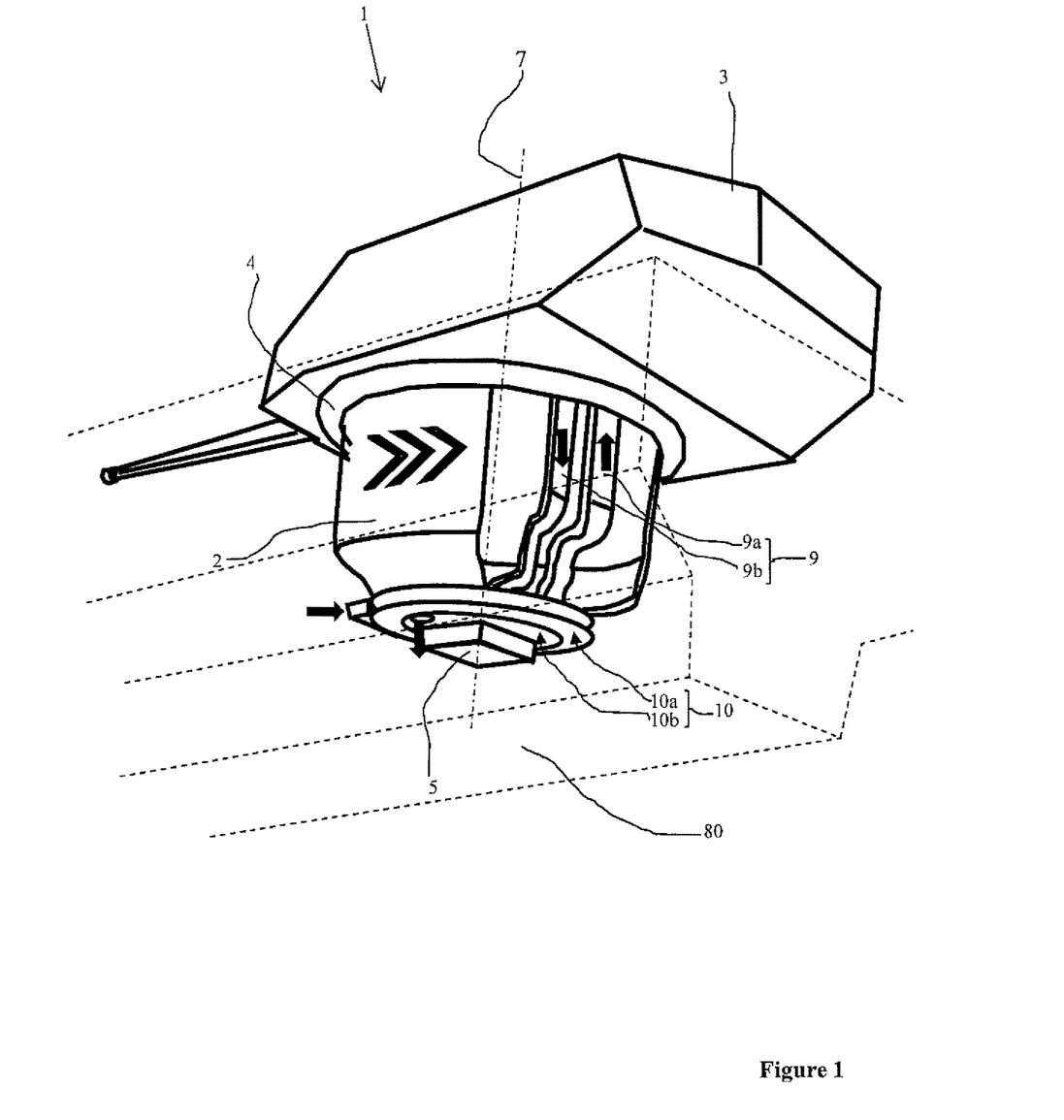
FIG. 1 shows a bottom three-quarter view of a vehicle turret according to the invention.

According to FIG. 1, a turret 1 of an armoured military vehicle has a turret basket 2 intended to receive onboard equipments as well as an operator (equipments and operator not visible).

The upper part of the turret is intended to protrude from a body 80 of the vehicle and has an armoured dugout 3. A ring gear 4 ensures a pivot connection allowing the turret 1 to pivot with respect to the body 80 of the vehicle around a vertical axis 7.

The bottom of the basket 2 of the turret 1 has an electrical rotating joint 5 for ensuring the electrical conduction between the turret 1 and the body 80 so as to allow the continuity of electrical flows intended to the controls or the power.

Ducts 9a and 9b for supplying air within the turret extend between the bottom of the basket 2 of the turret 1 and the upper part of the turret, thus constituting a turret aeraulic network 9.

The turret aeraulic network 9 has ducts 9a for supplying cold air from the body, and separate ducts 9b for returning to the body the air which has been warmed in the turret.

It is obvious for the one skilled in the art that the air conditioning and ventilating means can have a reversible operation which supplies hot air to the turret and removes colder air if required by the thermal and climatic conditions. According to another embodiment which is not preferred, it is also possible to supply air only in one direction and not to implement means for supplying it in the other direction.

The ducts 9a and 9b open in the upper part of the turret 1. In the lower part of the turret 1, they are connected to an air distribution device 10 which comprises aeraulic rotating joints 10a, 10b at the bottom of the basket 2 of the turret. The two rotating joints 10a, 10b of the case shown are coaxial with the axis of rotation 7 of the turret.

A first rotating joint 10a is connected to the cold air duct 9a of the aeraulic network 9 of the turret and a second rotating joint 10b is connected to the hot air duct 9b.

Thus, each rotating joint 10a and 10b is respectively dedicated to the supply of cold air to the turret 1 and of hot air to the body 80.

The rotating joints 10a and 10b are connected to a body ventilating network of ducts 17 of the body (visible in FIG. 4) having ducts 17a for supplying cold air from an air conditioning/ventilating unit and ducts 17b for discharging hot air to heat exchangers of this same unit.

Figure 4:
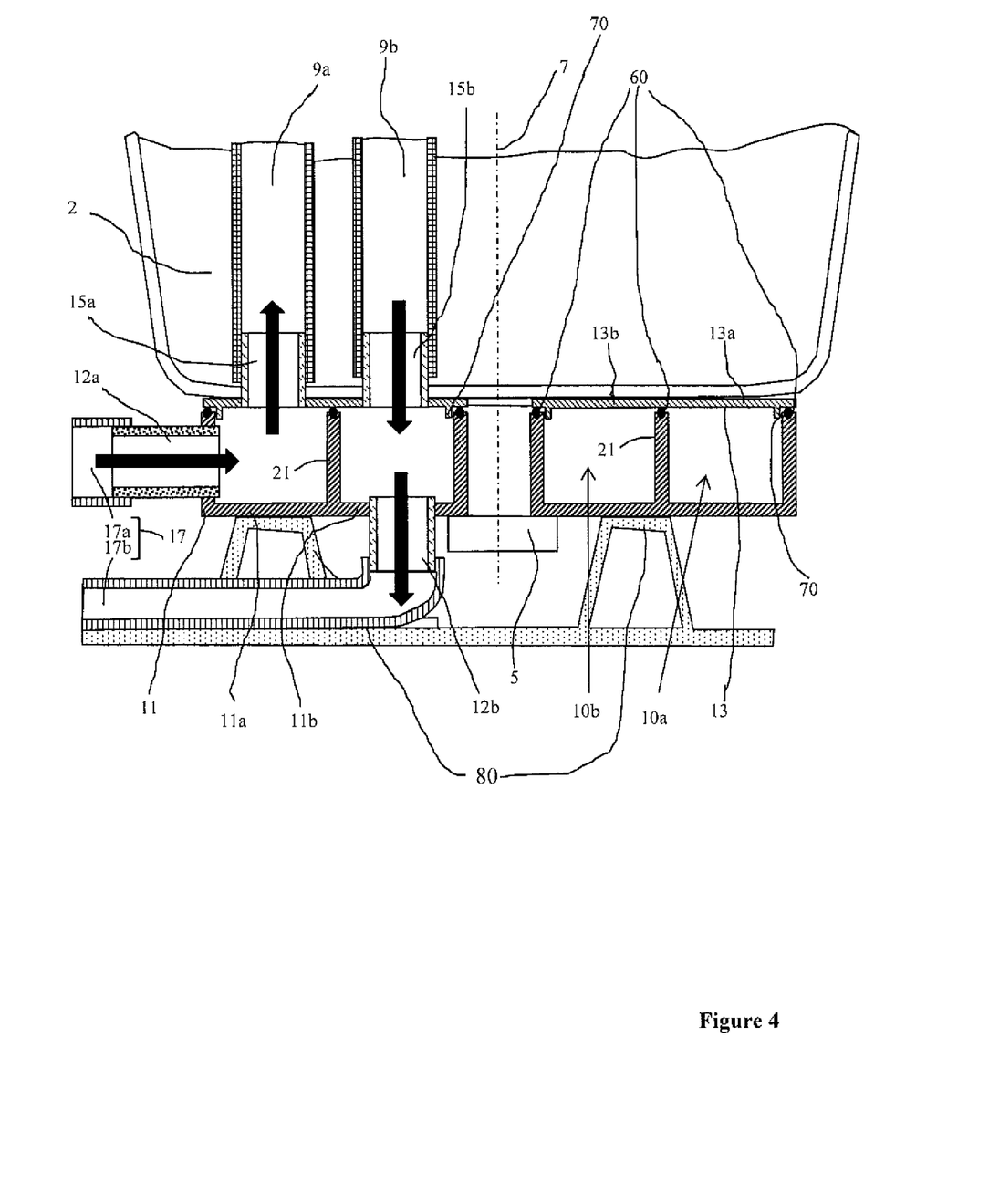
FIG. 4 shows a cross-sectional partial view of a vehicle comprising an air distribution device according to the invention.

One part of the rotating joint is mechanically integral with the body, and the other part is mechanically integral with the turret as visible in FIG. 4.

Figure 2:
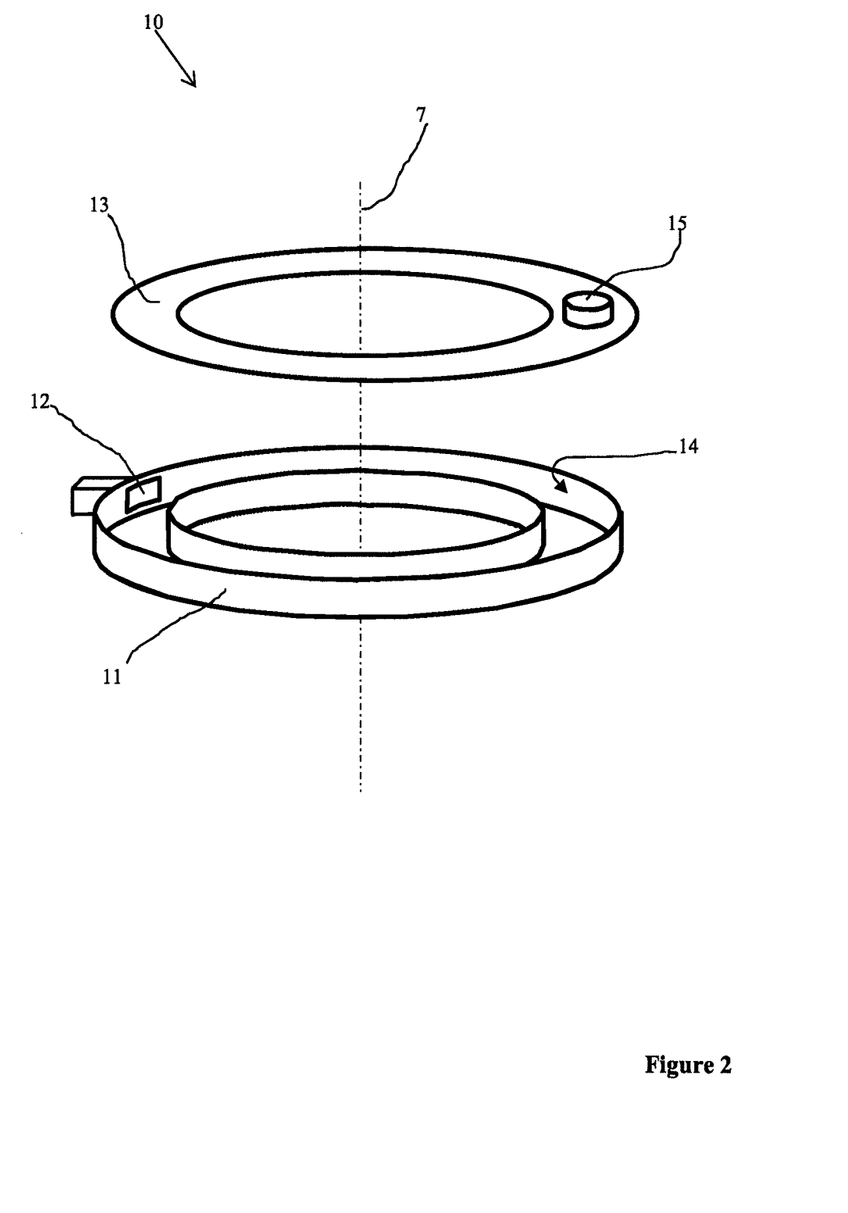
FIG. 2 shows an exploded view of an air distribution device according to the invention.

According to FIG. 2, a rotating joint 10a or 10b has an annular chute 11 having, in its upper part, an annular opening 14 concentric to the chute 11. The chute 11 has, at a point of the periphery thereof, a first orifice 12 for an air flow toward the body ventilating network 17 of the body 80.

According to FIG. 1, the first orifice 12 is intended to be connected to a duct of the body and the chute 11 is intended to be attached to the body 80 of the vehicle.

An annular closing ring 13 is intended to match with the opening 14. The ring 13 is rotatable with respect to the chute 11 and concentrically thereto, with forming an airtight connection between the ring 13 and the chute 11 once these two members are assembled. This connection will be better seen in FIG. 4.

The ring 13 has a second air flow orifice 15. According to FIG. 1, the ring 13 is integral with the turret 1 at the bottom of the basket 2 and the second orifice 15 is connected to a duct of the turret aeraulic network 9.

Figure 5:
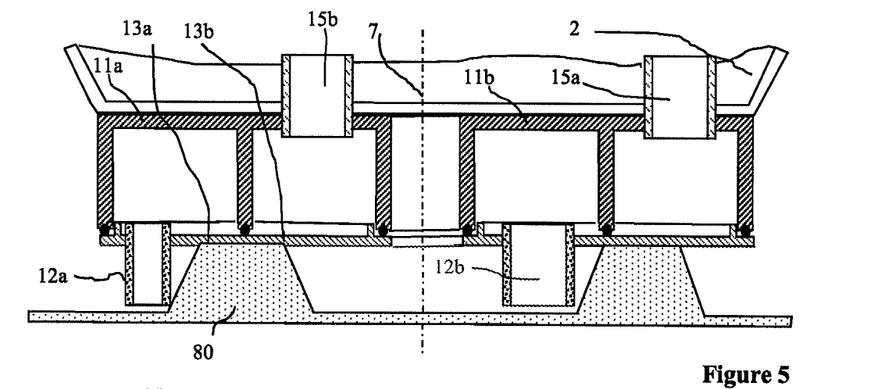
FIG. 5 shows a detailed view of a device according to the invention according to another embodiment.

It is obviously possible to provide the opposite attachment, that is, to make the chute 11 integral with the turret 2 and the ring 13 integral with the body 80 as visible in FIG. 5.

Figure 3:
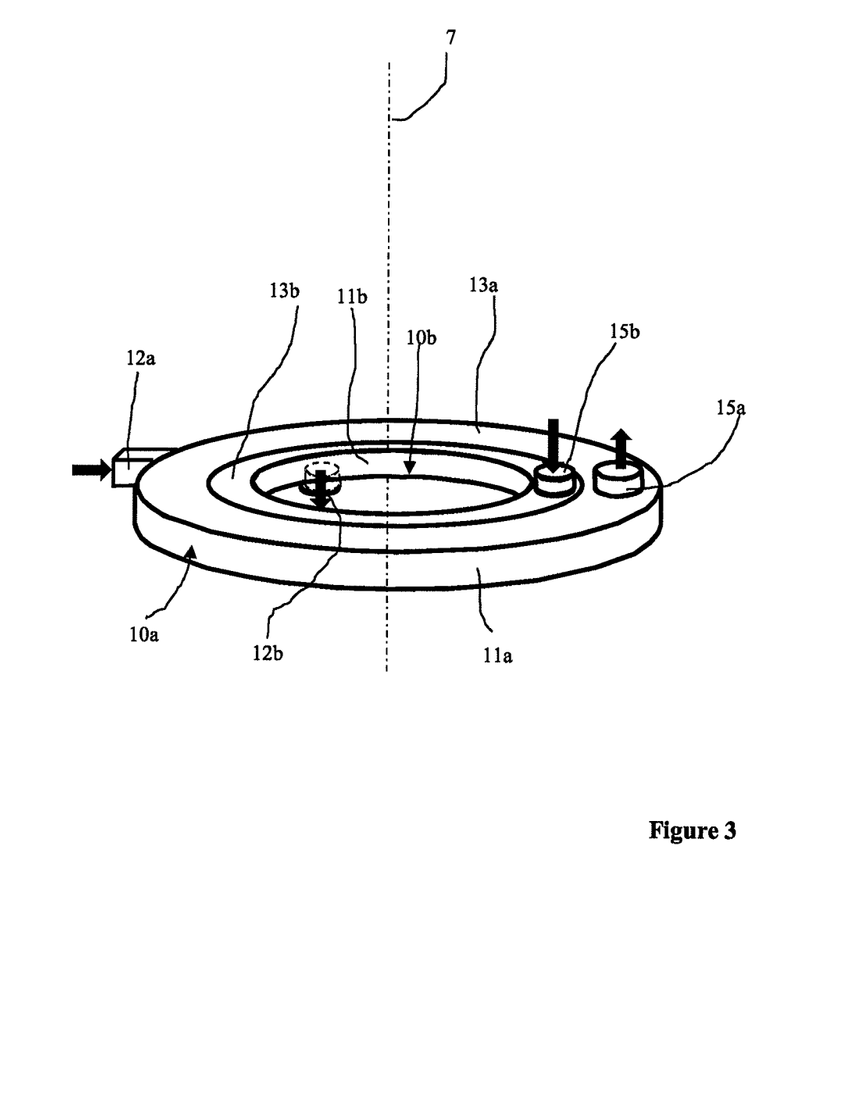
FIG. 3 shows a top three-quarter view of another embodiment of an air distribution device according to the invention.

According to FIG. 3, an air distribution device 10 according to another embodiment has two rotating joints 10a and 10b which are concentric around the axis 7 of the turret.

Each rotating joint 10a, 10b has a first air flow orifice 12a, 12b intended to be connected to the body ventilating network 17 and a second orifice 15a, 15b intended to be connected to the ventilating network 9 of the turret 1.

The chutes 11a and 11b of each rotating joint 10a and 10b are integral with the body 80 of the vehicle while the rings 13a and 13b are integral with the basket 2 of the turret 1 (the opposite assembly could also be possible).

In this manner, the device 10 ensures a dual-flow air distribution.

In the first rotating joint 10a, cold air flows from the body to the turret 1 and, in the second rotating joint 10b, warmed air flows from the turret to the body 80.

Such an arrangement improves the efficiency of the cooling of the turret.

In this manner, the turret 1 can freely rotate even with carrying out several consecutive rotations without limitation, since the rings 13a and 13b ensure an airtight connection with the chutes 11a and 11b.

According to the embodiment of FIG. 4, the chutes 11 are joined by one of their sides 21. Besides, the rings 13 form a single piece. Such an arrangement has the advantage of making the air distribution device 10 more compact and robust by making integral with each other the members which have to move together, such as the chutes 11a and 11b on the one hand and the rings 13a and 13b on the other hand.

The upper rims of the chutes 11 are provided with O-ring type sealing means 60 which are contiguous with the lower face of the rings 13.

These sealing means 60 will be ideally made of antifriction material in order to improve the pivoting of the rings 13 which are rotatably guided by shoulders 70 which match with the interior of the inner and outer walls of the chutes 11. It can be noted that the chutes 11 are integral with members of the body 80. The rings 13 are integral with the basket 2 of the turret 1 in order to be able to follow all the rotations around the axis 7.

Figure 6:
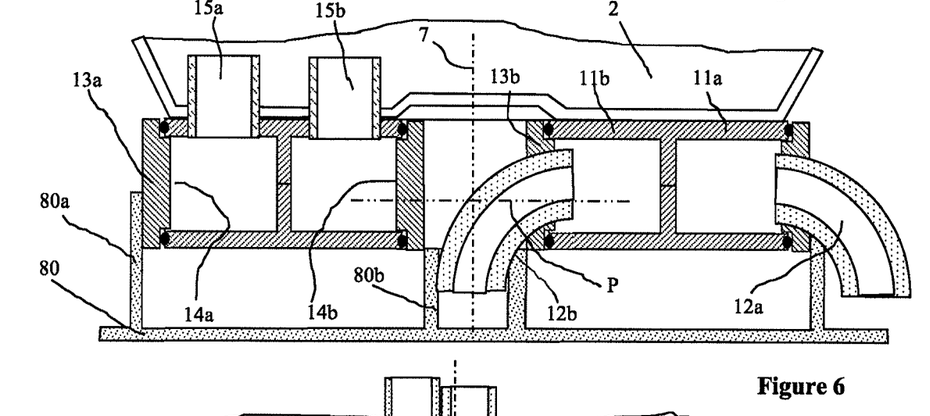
FIG. 6 shows a detailed view of a device according to the invention according to another embodiment.

FIG. 6 shows an embodiment in which two chutes 11a and 11b are juxtaposed at their bottom. The openings 14a and 14b of the chutes both being oriented according to a plane P perpendicular to the axis of pivoting of the turret 7. The opening 14a of the first chute 11a is arranged at the outer periphery of the ring formed by the chute 11a, the closing ring 13a is thus cylindrical and it is arranged facing this peripheral opening 14a.

The second chute 11b is located within the ring formed by the first chute 11a and comprises an opening 14b oriented to the interior of the ring. The second chute 11b is sealed by a second cylindrical closing ring 13b which is accommodated within the ring 11b thus formed by the second chute 11b.

The first and second closing rings 13a and 13b are integral with the body 80 of the vehicle at body posts 80a and 80b, while the chutes 11a and 11b are integral with the turret 2. In order to allow the assembly of the closing rings 13a and 13b on the chutes 11a and 11b, the body of the chutes is made of two parts fittable into each other along the direction of the axis 7 of the turret.

As in the preceding embodiments, seals with a low friction coefficient allow the chutes to pivot with respect to the closing rings.

Figure 7:
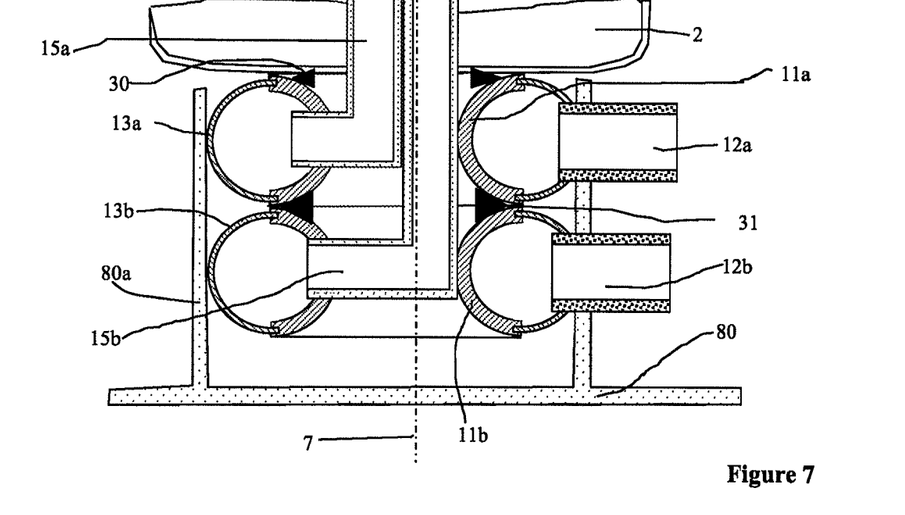
FIG. 7 shows a detailed view of a device according to the invention according to another embodiment.

According to the embodiment of FIG. 7, the chutes 11*a* and 11*b* provided with their closing rings 13*a*, 13*b* have a circular-section which is generally toroidal in shape and are superimposed on each other. Each chute 11*a*, 11*b* forms a half of the torus, and the corresponding closing ring 13*a*, 13*b* forms the other half of the torus. The chutes 11*a* and 11*b* can pivot around the axis 7 of the turret with respect to the closing rings 13*a* and 13*b*. To this end, the chutes have circular grooves in which the closing rings engage.

In this case, the first chute 11*a* is made integral with the basket 2 of the turret by attachment means 30. This same chute ha is integral with the second chute 11*b* located below by other attachment means 31.

Both closing rings 13*a* and 13*b* closing the openings of the chutes 11*a* and 11*b* are integral with the body 80 of the vehicle by body posts 80*a* and 80*b*. The rotation of the turret 2 thus causes the chutes 11*a* and 11*b* to be driven while the closing rings 13*a* and 13*b* are fixed with respect to the body 80.

It can be noted that each air distribution device is intended to supply air under low pressure lower than 1.5 bars (0.15 mega Pascals) for air flow speeds of no more than 20 meters per second. The effective area for the supply of air is between 25 and 400 square centimeters.

According to another embodiment shown in FIGS. 8 to 11, a door 50 closes an opening 51 which allows to access the turret. This door 50 pivots around the axis 7 of the turret to which it is connected by a plate 52. The plate 52 is located between the basket 2 of the turret and the air distribution device 10 (visible in FIG. 8).

Figure 8:
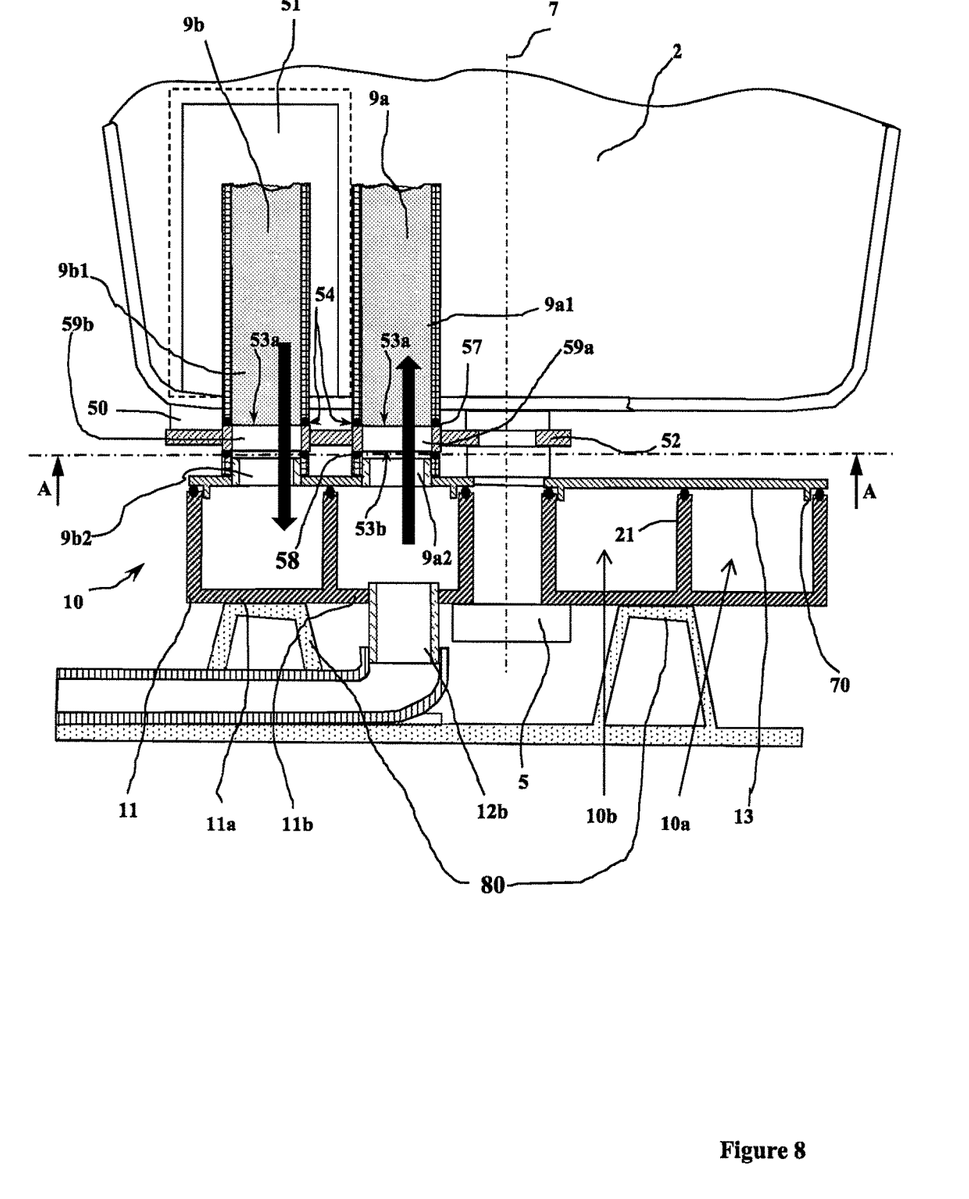
FIG. 8 shows a cross-sectional view of a device according to another embodiment of the invention, the cross-section being made along parallel planes the trace of which is marked BB in FIG. 10.
Figure 9A:
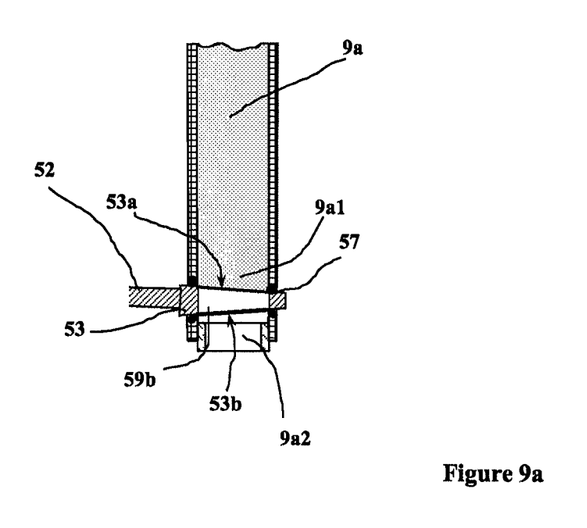
FIG. 9a shows a cross-sectional detailed view along the plane CC in FIG. 10, the view corresponding to a position of the turret with a door closed.
Figure 9B:
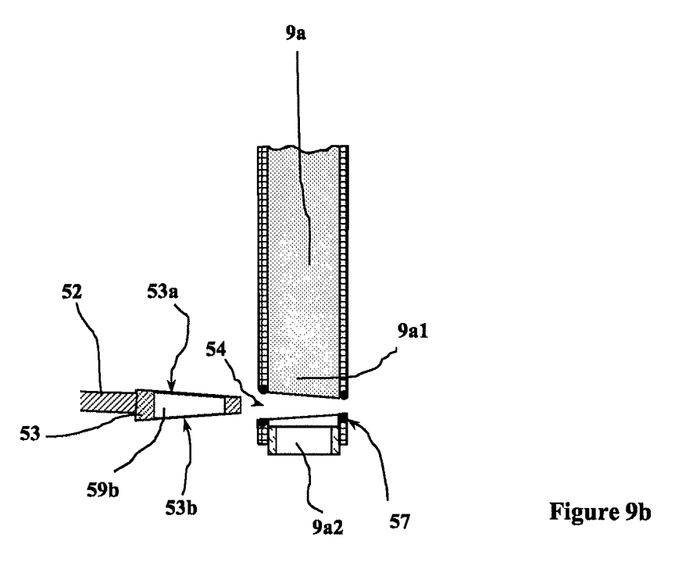
FIG. 9b shows a cross-sectional view similar to FIG. 9a, but showing the device with the plate removed from the ducts during the opening movement of the door.
Figure 10:
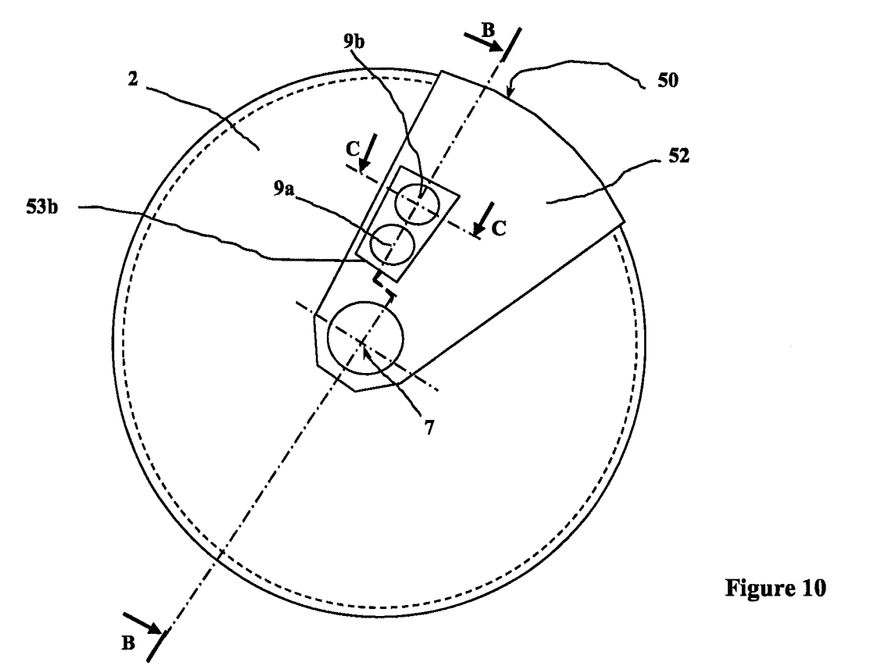
FIG. 10 shows a schematic bottom view of the device according to this embodiment of the invention, the cross-sectional plane of which is marked AA in FIG. 8, the door of the turret being closed.

FIG. 8 is a cross-sectional view along parallel planes the trace BB of which is marked in FIG. 10. This plane intersects the basket and the air distribution device 10 at the axis 7 and also at both ducts 9*a* and 9*b*.

The plate 52 is located in a plane transversal and perpendicular to the axes of the ducts 9*a* and 9*b*.

Each duct 9*a* and 9*b* is divided into two coaxial parts 9*a*1 and 9*a*2 (respectively 9*b*1 and 9*b*2), the plate 52 moving between these two parts.

When the door 50 is in closed position, a wedge shape 53 integral with the plate 52 crosses each duct 9*a* and 9*b*. The wedge shape 53 is more particularly visible in FIGS. 9*a* and 9*b* which are partial cross-sections along a plane CC the trace of which is marked in FIG. 10. This plane CC is perpendicular to the parallel planes BB.

Figure 11:
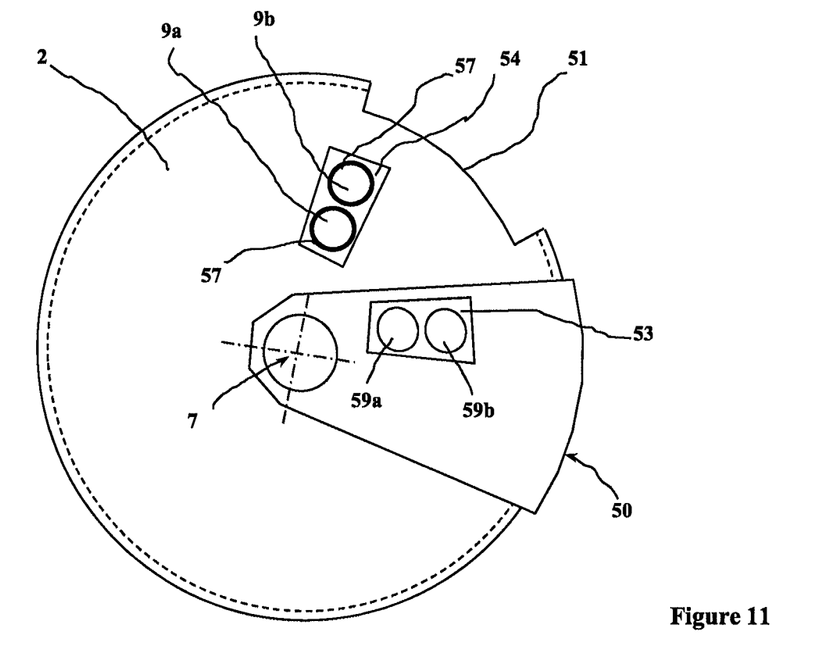
FIG. 11 shows a view similar to FIG. 10, in which the door of the turret is opened.

This wedge shape 53 is beveled so as to match with a notch shape 54*a*, 54*b* of the gap separating each duct 9*a*, 9*b* into its two coaxial parts 9*a*1 and 9*a*2 (respectively 9*b*1 and 9*b*2). As it is can be seen in FIG. 11, a single wedge shape 53 carried by the plate 52 engages into the notches 54*a* and 54*b* of both ducts 9*a* and 9*b*. The wedge shape 53 has two bores 59*a* and 59*b* which are intended to cause both parts of each duct 9*a*,9*b* to communicate with each other.

The edges of both parts of each duct 9*a*, 9*b* will be advantageously provided with a seal 57 and 58 which will be applied to the upper 53*a* and lower 53*b* faces of the wedge shape 53 so as to ensure the sealing of the flow of conditioned air through two bores 59*a* and 59*b* which go through the wedge shape 53 and are each located facing the section of the duct 9*a* and 9*b* which is crossed by the wedge shape 53.

As it can be seen in FIGS. 10 and 11, the closing movement of the door 50, which is a pivoting movement of the plate 52 around the axis 7, allows to engage the wedge shape 53 between both parts 9*a*1,9*a*2, 9*b*1,9*b*2 of each duct 9*a*, 9*b*.

This movement, by means of the wedge shape 53, allows to apply a pressure of the upper faces 53*a* and 53*b* to the edges of both parts 9*a*1,9*a*2, 9*b*1,9*b*2 of each duct 9*a*,9*b*, thereby ensuring a perfect sealing.

When the door 50 pivots in the opening direction (open position visible in FIGS. 9*a* and 11), the wedge shape 53 is disengaged out of the ducts 9*a* and 9*b*.

The invention claimed is:

1. An air-conditioning air distribution device for a vehicle turret rotatably mounted with respect to a body of the vehicle, the vehicle turret having an axis of rotation, wherein the air-conditioning air distribution device comprises a first annular chute and a second annular chute that are coaxial with the axis of rotation of the vehicle turret, and each of the first and second annular chutes comprising a first flow orifice, the first and second annular chutes each having an annular opening, each of the first and second annular chutes and its annular opening being concentric, each of the first and second annular chutes comprising a closing ring which closes the annular opening of the respective annular chute, the closing ring being rotatable with respect to the first and second annular chutes and comprising a second air flow orifice that is concentrically rotatable with the axis of rotation, each of the first and second annular chutes being intended to be made integral with one of the body and the vehicle turret, while the closing ring is intended to be made integral with the other of the body and the vehicle turret.

2. The air-conditioning air distribution device according to claim 1, further comprising means for air sealing at the connection between said each annular chute and its respective closing ring.

3. A vehicle comprising a turret having a ventilating network and a body having a ventilating network, the ventilating network of the turret and the ventilating network of the body each comprising ducts for supplying air and separate ducts for returning air, the turret being pivotably mounted on an axis with respect to the body, wherein the vehicle comprises an air-conditioning air distribution device comprising a first annular and a second annular chute that are coaxial with the axis of rotation of the turret, and each of the first and second annular chutes having a first flow orifice, the first and second annular chutes each having an annular opening, each of the first and second annular chutes and its annular opening being concentric, each of the first and second annular chutes comprising a closing ring which closes the annular opening of the respective annular chute, the closing ring being rotatable with respect to the first and second annular chutes and comprising a second air flow orifice, each of the first and second annular chutes being made integral with one of the body and the turret, while the closing ring is made integral with the other of the body and the turret, one of the first and second annular chutes comprising a duct for supplying air from the body to the turret, and the other annular chute comprising a duct for returning air from the turret to the body.

4. The vehicle according to claim 3, wherein the first and second annular chutes are integral with the body and connected to the ventilating network of the body at the first flow orifices, the closing rings being integral with the turret and connected to the ventilating network of the turret by the second air flow orifices.

5. The vehicle according to claim 3, wherein the second air flow orifices are each extended toward the turret by a duct of the ventilating network of the turret, said duct of the ventilating network of the turret being divided into two coaxial parts, the turret having a movable plate which transversely crosses each duct of the ventilating network of the turret between the two coaxial parts, the movable plate being movable between a so-called open position and a so-called closed position, the movable plate comprising at least one wedge-shaped member which is intended to he inserted, when in closed position, within the two coaxial parts of each duct so as to ensure the sealing between the two coaxial parts of each duct of the ventilating network of the turret, each wedge-shaped member having at least one bore for the circulation of air, the bore being arranged facing the section of the duct that is crossed.

6. The vehicle according to claim 5, wherein the movable plate is integral with a door and pivots coaxially to the turret between a closed position and an open position of said door.

* * * * *